US010275939B2

(12) United States Patent
Golovinskiy et al.

(10) Patent No.: US 10,275,939 B2
(45) Date of Patent: Apr. 30, 2019

(54) DETERMINING TWO-DIMENSIONAL IMAGES USING THREE-DIMENSIONAL MODELS

(71) Applicant: Google Inc., Mountain View, CA (US)

(72) Inventors: Aleksey Golovinskiy, San Francisco, CA (US); Brett Allen, San Francisco, CA (US); Alvin Jon-Hang Law, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 239 days.

(21) Appl. No.: 14/933,909

(22) Filed: Nov. 5, 2015

(65) Prior Publication Data

US 2017/0228926 A1    Aug. 10, 2017

(51) Int. Cl.
*G06T 17/05* (2011.01)
*G06T 15/20* (2011.01)
*G06T 15/04* (2011.01)

(52) U.S. Cl.
CPC .............. *G06T 17/05* (2013.01); *G06T 15/04* (2013.01); *G06T 15/20* (2013.01)

(58) Field of Classification Search
CPC ....... G06T 7/0065; G06T 11/60; G06T 17/05; G06T 15/20; G06T 9/20; G06T 2200/08
USPC ............... 345/418, 419, 420, 421, 424, 427; 382/276, 277, 285, 286, 293, 294
See application file for complete search history.

(56) References Cited

U.S. PATENT DOCUMENTS

| | | |
|---|---|---|
| 6,525,731 B1 | 2/2003 | Suits et al. |
| 7,348,989 B2 | 3/2008 | Stevens et al. |
| 7,369,136 B1 | 5/2008 | Heckbert et al. |
| 7,558,400 B1 | 7/2009 | Toksvig et al. |
| 7,873,238 B2 | 1/2011 | Schultz et al. |
| 8,159,524 B2 | 4/2012 | Wilson et al. |
| 8,279,218 B1 | 10/2012 | Fan et al. |
| 8,723,953 B2 | 5/2014 | Klomp et al. |
| 2003/0044088 A1 | 3/2003 | Wright |
| 2004/0012603 A1 | 1/2004 | Pfister et al. |
| 2004/0150638 A1 | 8/2004 | Ikeuchi et al. |
| 2005/0219256 A1 | 10/2005 | Donovan et al. |
| 2006/0017722 A1 | 1/2006 | Hong et al. |
| 2007/0237420 A1 | 10/2007 | Steedly et al. |
| 2007/0247473 A1 | 10/2007 | Li |
| 2009/0128549 A1 | 5/2009 | Gloudemans et al. |

(Continued)

OTHER PUBLICATIONS

Cho, Peter, and Noah Snavely. "3D Exploitation of 2D Imagery." Lincoln Laboratory Journal, vol. 20, No. 1, (2013), pp. 105-137.*

(Continued)

*Primary Examiner* — Sarah Lhymn
(74) *Attorney, Agent, or Firm* — Dority & Manning, P.A.

(57) ABSTRACT

Systems and methods for determining two-dimensional (2D) images are presented. For instance, data indicative of a three-dimensional (3D) model of a geographic area can be obtained. A 2D output image can be generated depicting at least a portion of the geographic area based at least in part on the 3D model. Each pixel in the output image can then be reprojected to the 3D model. A plurality of aerial images depicting the geographic area can be obtained. A source image can then be determined for each pixel in the output image from the plurality of aerial images. The source image can be determined based at least in part on the reprojection of the pixel in the output image to the three-dimensional model.

18 Claims, 6 Drawing Sheets

(56) References Cited

U.S. PATENT DOCUMENTS

| | | |
|---|---|---|
| 2012/0120069 A1 | 5/2012 | Kodaira et al. |
| 2013/0009950 A1 | 1/2013 | Ben-David et al. |
| 2013/0322702 A1 | 12/2013 | Piemonte et al. |
| 2014/0064554 A1* | 3/2014 | Coulter ............... G06K 9/3216 382/103 |

OTHER PUBLICATIONS

Debevec et al., "Modeling and Rendering Architecture from Photographs: A Hybrid Geometry- and Image-Based Approach", Proceedings of the 23$^{rd}$ Annual Conference on Computer Graphics and Interactive Techniques, Aug. 4-9, 1996, New Orleans, Louisiana, pp. 11-20.

Grimm et al., "Technical Report WUCS-2002-9: Creating View-Dependent Texture Maps", Washington University in St. Louis, Department of Computing Science, Nov. 22, 2000, 9 pages.

Pasewaldt et al., "Multiscale Visualization of 3D Geovirtual Environments Using View-Dependent Multi-Perspective Views", Journal of WSCG, vol. 19, Jan. 2011, pp. 111-118.

Pollefeys et al., "Detailed Real-Time Urban 3D Reconstruction from Video", International Journal of Computer Vision, vol. 78, Issue 2, Jul. 2008, pp. 143-167.

Pourquet et al., "Real-Time High-Quality View-Dependent Texture Mapping Using Per-Pixel Visibility", Proceedings of the 3$^{rd}$ International Conference on Computer Graphics and Interactive Techniques in Australasia and South East Asia, Nov. 29-Dec. 2, 2005, Dunedin, New Zealand, pp. 213-220.

Purnomo et al., "Seamless Texture Atlases", Proceedings of the 2004 Eurographics Symposium on Geometry Processing, Jul. 8-10, 2004, Nice, France, pp. 65-74.

Semmo et al., "Interactive Visualization of Generalized Virtual 3D City Models Using Level-of-Abstraction Transitions", Computer Graphics Forum, vol. 31, Issue 3pt1, Jun. 2012, pp. 885-894.

\* cited by examiner

DETERMINING TWO-DIMENSIONAL IMAGES USING THREE-DIMENSIONAL MODELS

FIELD

The present disclosure relates generally to aerial imagery, and more particular to determining images of a geographic area based at least in part on aerial imagery.

BACKGROUND

Geographic information systems provide for the archiving, retrieving, and manipulating of data that has been stored and indexed according to geographic coordinates of its elements. A geographic information system can be used for storing, manipulating, and displaying graphical representations of a geographic area. In particular, such graphical representations can include a two-dimensional (2D) image of the geographic area. For instance, such 2D image can be a mosaic image. An interactive geographic information system can present the image of the geographic area to a user in a suitable user interface, such as a browser. A user can navigate the mosaic image by controlling a virtual camera that specifies what portion of the mosaic image is rendered and presented to a user.

Conventional techniques for creating such images can include capturing a plurality of aerial images depicting overlapping portions of the geographic area and stitching projections of the aerial images on smoothed terrain to create an output image. As another example, images can be created by rendering a textured three-dimensional (3D) model of the geographic area from a desired viewing angle. Such 3D model can include a polygon mesh, such as a triangle mesh, used to model the geometry (e.g. terrain, buildings, and other objects) of the geographic area. Geographic imagery, such as aerial or satellite imagery, can be texture mapped to the 3D model so that the 3D model provides a more accurate and realistic representation of the scene.

However, such conventional techniques may cause inconsistent depictions of the geographic area. For instance, such techniques may result in mosaic images having visible seams and/or buildings that lean in inconsistent manners. As another example, such techniques can result in mosaic images that include unwanted artifacts or flickering.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of determining a mosaic image. The method includes obtaining, by the one or more computing devices, data indicative of a three-dimensional model of the geographic area. The method further includes generating, by the one or more computing devices, a two-dimensional output image depicting at least a portion of the geographic area based at least in part on the three-dimensional model of the geographic area. The method further includes reprojecting, by the one or more computing devices, each pixel in the output image to the three-dimensional model. The method further includes obtaining, by the one or more computing devices, a plurality of aerial images depicting the geographic area. The method further includes determining, by the one or more computing devices, for each pixel in the output image, a source image from the plurality of aerial images based at least in part on the reprojection of the pixel in the output image to the three-dimensional model.

Other example aspects of the present disclosure are directed to systems, apparatus, tangible, non-transitory computer-readable media, user interfaces, memory devices, and electronic devices for determining mosaic images and/or mosaic image textures from aerial images.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to determining a two-dimensional (2D) "mosaic" image of a geographic area. In particular, data indicative of a three-dimensional (3D) model of the geographic area can be obtained. An output image of the geographic area can then be generated at least in part by capturing one or more virtual snapshots of the 3D model from a desired perspective or viewpoint. Each pixel in the output image can be reprojected onto the 3D model. In particular, a camera ray associated with each pixel in the output image can be traced back to the corresponding source point on the 3D model. A texture of the image mosaic can then be determined. In particular, determining the texture can include selecting a source image for each pixel in the output image. The source image can be selected from a plurality of aerial images that depict the geographic area.

More particularly, the data indicative of a 3D model of the geographic area can be a polygon mesh of the geographic area. The polygon mesh can include a plurality of polygons (e.g. triangles) interconnected by vertices and edges to model the geometry of the geographic area. For instance, in some implementations, the polygon mesh can be generated at least in part from a plurality of aerial images depicting the geographic area. The plurality of aerial images may depict overlapping portions of the geographic area. The aerial images may be captured, for instance, by one or more airplanes, helicopters, unmanned aerial vehicles, satellites, air balloons, and/or various other aircrafts. The aerial images may be captured from different perspectives, such as nadir perspectives and/or various oblique perspectives.

An output image can be generated based at least in part on the 3D model. The output image can represent at least a portion of the geographic area from a desired viewpoint. For instance, the desired view point may be a nadir viewpoint, an oblique viewpoint, or other viewpoint. A nadir viewpoint can be a viewpoint having camera rays that project directly downward. An oblique viewpoint may be a viewpoint having camera rays that project downward at an angle. In some implementations, desired viewpoint may be an orthogonal oblique viewpoint having camera rays that project downward in the same direction at the same angle.

For instance, the output image may be generated by capturing a plurality of snapshots of the 3D model using a virtual camera. The one or more snapshots can each depict a portion of the geographic area. The one or more snapshots can be taken from the perspective of the desired viewpoint. In some implementations, the virtual camera can be a perspective camera or an orthographic camera. In this manner, the output image can be a perspective projection or an orthographic projection of the 3D model to the desired view point.

In other implementations, the camera may be associated with a hybrid perspective-orthographic projection that corresponds to various aspects of a perspective camera and an orthographic camera. For instance, the hybrid perspective-orthographic projection can have associated camera rays that originate from different points, and project in different directions relative to the 3D model. In this manner, towards the center of a particular snapshot or tile associated with the hybrid perspective-orthographic projection, the projection may approximate a perspective or pinhole projection, and towards the edges of the snapshot or tile, the projection may approximate an orthographic projection.

According to example aspects of the present disclosure, each pixel of the generated output image can then be reprojected onto the 3D model. In particular, each pixel of the output image can be reprojected onto a corresponding source point of the 3D model. For instance, in some implementations, a camera ray associated with each pixel can be traced from the pixel in the output image to the source point of the 3D model. One or more candidate source images can be identified for each pixel of the output image based at least in part on the reprojection. In particular, in some implementations, each aerial image of the plurality of aerial images that sees the source point of the 3D model can be identified as a candidate source image for the corresponding pixel of the output image.

A candidate source image can then be selected as a source image for each pixel. For instance, a candidate source image can be selected as source image based at least in part on the pose of the candidate source image. As used herein, the pose of an image refers to the position and orientation of a camera that captured the image relative to a reference. In this manner, the source image can be selected by determining a direction of the camera rays in the candidate source images that are associated with the pixels corresponding to the source point in the 3D model. For instance, in some implementations, the source image can be selected based at least in part on a consistency in direction between the camera ray of the source image and the camera ray associated with output image (e.g. the camera ray projecting from the corresponding pixel of the output image to the source point of the 3D model). In other implementations, the source image may be selected based at least in part on a consistency in direction between the camera ray of the source image and parallel to the normal of the viewpoint.

As another example, the source image for a pixel may further be selected based at least in part on the source image selected for one or more neighboring pixels. For instance, the source image for the pixel can be selected such that the same source image is used in neighboring pixel(s). In this manner, the source image can be selected to minimize or reduce a number of source images used and to increase the consistency between source images used for neighboring pixels.

In some implementations, the source images may be selected based at least in part on an optimization having simultaneous objectives of increasing the consistency in the directions of the camera rays associated with the source image pixels and the corresponding mosaic pixels, and increasing the consistency of source images used for neighboring pixels. In this manner, the source image for a pixel can be selected based at least in part on a trade off between the two objectives of the optimization.

Once the source images for each pixel in the output image are determined, an image, such as a mosaic image, can be generated using the selected source images. For instance, the source images for each pixel can be mapped to the corresponding pixels of the output image to generate the mosaic image. The mosaic image can then be provided for display, for instance, in a user interface associated with a geographic information system. For instance, the image may be provided for display in a viewport associated with the geographic information system that allows a user to interact with the image. For instance, the user may be able to select a desired viewing angle (e.g. nadir, oblique, etc.), zoom in or out, pan in various directions, and/or perform various other interactions with the image.

Figure 1:
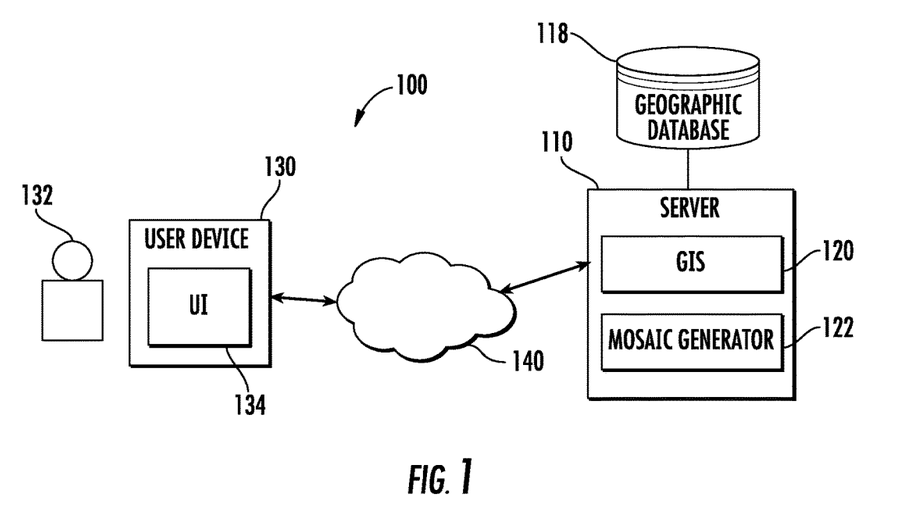
FIG. 1 depicts an overview of an example system for determining mosaic images according to example embodiments of the present disclosure.

With reference now to the figures, example aspects of the present disclosure will be discussed in greater detail. For instance, FIG. 1 depicts an overview of an example system 100 for determining 2D images according to example embodiments. The system 100 can include a server 110 for hosting a geographic information system 120. The server 110 can be any suitable computing device, such as a web server. The server 110 can be in communication with a user device 130 over a network 140, such as the Internet. The user device 130 can be any suitable computing device, such as a laptop, desktop, smartphone, tablet, mobile device, wearable computing device, or other computing device.

The server 110 can host an interactive geographic information system 120 that serves geographic data stored, for instance, in a geographic database 118. For instance, the geographic database 118 can include geographic data for rendering a two-dimensional (2D) mosaic image of a geographic area. The geographic data can include a plurality of source images depicting the geographic area, a three-dimensional (3D) model (e.g. polygon mesh) representing the geometry of the geographic area, and one or more textures for mapping to the polygon mesh. The geographic data can be stored in a hierarchical tree data structure, such a quadtree or octree data structure, that spatially partitions the geographic data according to geospatial coordinates.

The polygon mesh can include a plurality of polygons (e.g. triangles) interconnected by vertices and edges to model the geometry of the geographic area. The polygon mesh can be represented in any suitable format, such as a depth map, height field, closed mesh, signed distance field, or any other suitable type of representation. The polygon mesh can be a stereo reconstruction generated from aerial imagery of the geographic area. The imagery can be taken by overhead cameras, such as from a satellite or aircraft, at various oblique or nadir perspectives. In the imagery, features are detected and correlated with one another. The points can be used to determine a stereo mesh from the imagery. In this way, a three-dimensional model can be determined from two-dimensional imagery. The geographic data can also include a plurality of textures that can be mapped to the polygon mesh to provide a three-dimensional model of the geographic area. The textures can be generated from aerial or satellite imagery of the geographic area.

System 100 can further include a mosaic generator 122 configured to generate a 2D image, such as a 2D mosaic image, of the geographic area. For instance, in example embodiments, the mosaic generator 122 can be configured to generate an output image by creating a projection of the 3D model from a desired viewpoint. In some implementations, the projection can be created by capturing one or more snapshots of the geographic area with a virtual camera from the perspective of the viewpoint. An output image can be generated using the snapshots. Each pixel in the output image can then be traced back to a corresponding source point on the 3D model. A source image can be selected for each pixel in the output image from one or more candidate source images (e.g. from the plurality of aerial images) that see the source point. A mosaic image can then be generated based at least in part on the source images. In some implementations, the mosaic image can be generated by texturing the output image using the source images.

Referring still to FIG. 1, the user device 130 can implement a user interface 134 that allows a user 132 to interact with the geographic information system 120 hosted by the server 110. The user interface 134 can be a browser or other suitable client application that can render an image of the geographic area on a display device associated with the user device 130. The user 132 can interact with the user interface 134 to pan, tilt, zoom, or otherwise navigate to view different portions of the mosaic image of the geographic area from different perspectives.

In response to the user interactions with the user interface 134, requests for geographic data can be provided from the user device 130 over the network 140 to the server 110. The server 110 can provide geographic data, such as a mosaic image and one or more textures, to the user device 130. The user device 130 can then render one of the textures in conjunction with the mosaic image from a desired viewpoint to present the mosaic image of the geographic area to the user.

Figure 2:
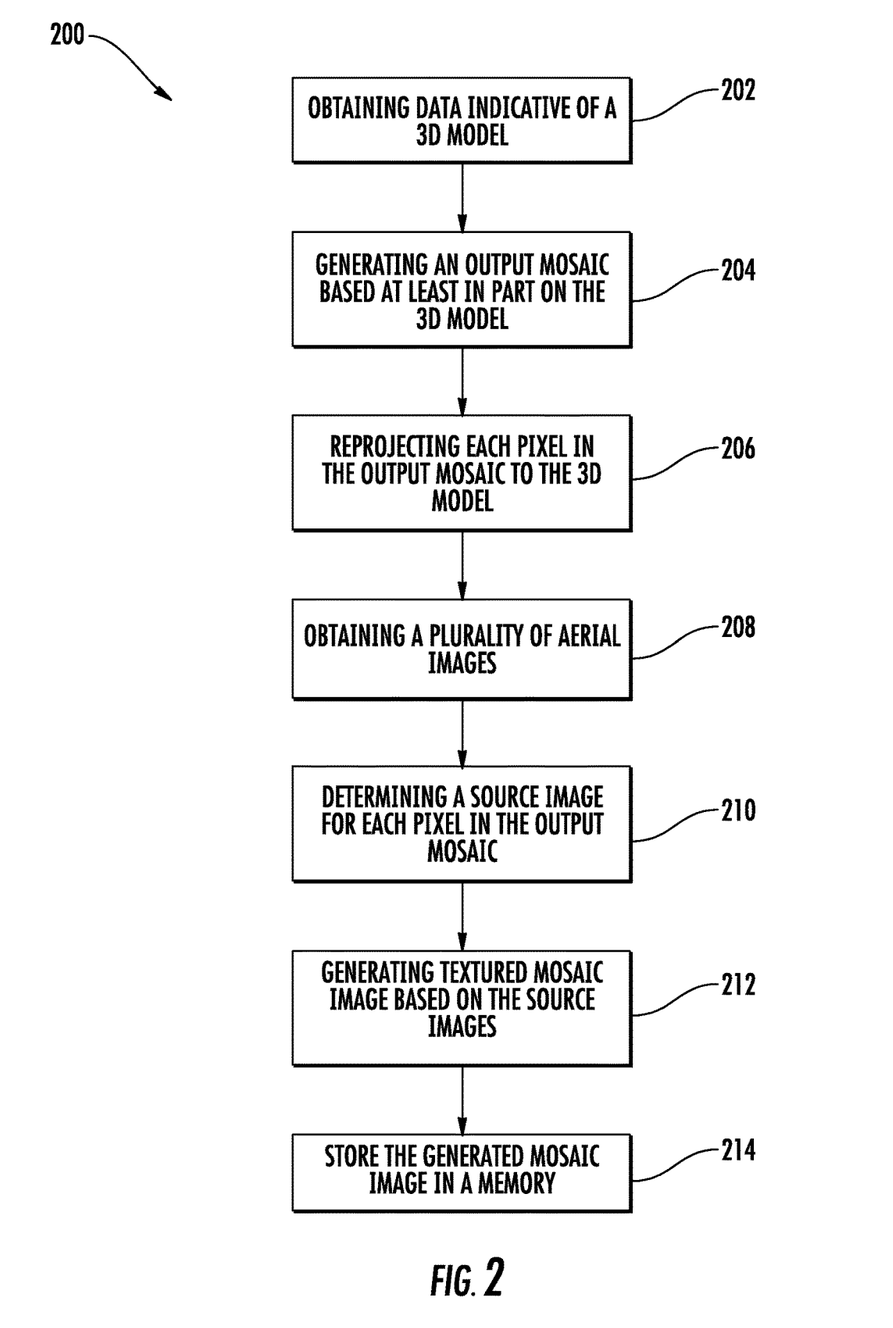
FIG. 2 depicts a flow diagram of an example method of determining mosaic images according to example embodiments of the present disclosure.
Figure 3:
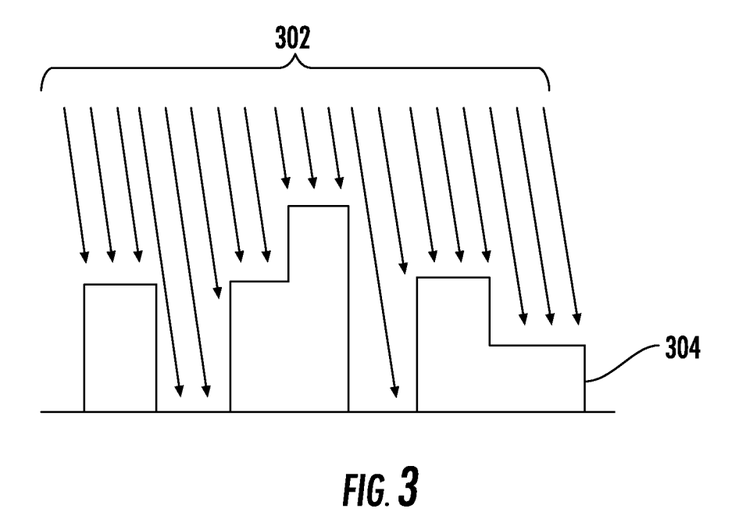
FIG. 3 depicts a plurality of example camera rays according to example embodiments of the present disclosure.

FIG. 2 depicts a flow diagram of an example method (200) of determining an image of a geographic area according to example embodiments of the present disclosure. Method (200) can be implemented by one or more computing devices, such as one or more of the computing devices depicted in FIG. 6. In particular implementations, the method (200) can be implemented by the geographic information system 120 and mosaic generator 122 of FIG. 1. In addition, FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (202), method (200) can include obtaining data indicative of a 3D model. For instance, the 3D model can be represented as a polygon mesh. The polygon mesh can include a plurality of polygons (e.g. triangles) interconnected by vertices and edges to model the geometry of the geographic area. The polygon mesh can be represented in any suitable format, such as a depth map, height field, closed mesh, signed distance field, or any other suitable type of representation. The polygon mesh can be a stereo reconstruction generated from aerial imagery depicting the geographic area.

At (204), method (200) can include generating an output image depicting at least a portion of the geographic area based at least in part on the 3D model. For instance, in some implementations, the output image can be generated by rendering the 3D model from a desired view angle or viewpoint. In some implementations, the output image can be generated by creating a projection of the 3D model (or a portion of the 3D model) from the desired view angle or viewpoint. The projection can be created by taking one or more snapshots of the 3D model using a virtual camera (e.g. a perspective virtual camera, an orthographic virtual camera, or a hybrid perspective-orthographic virtual camera). In particular, the one or more snapshots can be taken from the desired viewpoint or view angle.

At (206), method (200) can include reprojecting each pixel in the output image to the 3D model. In particular, each pixel in the output image can have a corresponding source point on the 3D model. The source point can represent the same surface of the geographic area as is depicted in the pixel of the output image. Reprojecting each pixel in the output image to the 3D model can include tracing a camera ray from the pixel to the source point. The camera ray can be a vector projecting from the pixel in the output image to the source point on the 3D model. In this manner, the camera ray can be indicative of a viewing angle associated with the output image relative to the 3D model and/or the geographic area.

For instance, FIG. 3 depicts a plurality of camera rays 302 being traced to a 3D model 304. In particular, each camera ray 302 can correspond to a pixel in an output image (not shown) generated according to example aspects of the present disclosure. As indicated above, each camera ray 302 can be traced from the pixel in the output image to the corresponding source point on the 3D model 304. As shown, the camera rays 302 are directed equally in the same direction, at the same angle (e.g. camera rays 302 are parallel). This can be indicative of an orthographic output image. It will be appreciated that the output image may be associated with a perspective projection or a hybrid perspective-orthographic projection. In such instances, camera rays 302 may be directed at different angles.

Referring back to FIG. 2, at (208), method (200) can include obtaining a plurality of aerial images. For instance the aerial images can depict at least a portion of a geographic area from various nadir or oblique perspectives. In some implementations, the aerial images may depict overlapping portions of the geographic area. In some implementations, at least a portion of the aerial images may be the aerial images used in creating the 3D model. As indicated above, the aerial images can be captured by an image capture device associated with a satellite or aircraft, such as an airplane, helicopter, unmanned aerial device or other aircraft.

At (210), method (200) can include determining a source image for each pixel in the output image. The source image for a pixel can be determined based at least in part on the camera ray associated with the pixel. The source image can be selected from one or more candidate source images associated with the pixel. The one or more candidate source images can be the aerial images from the plurality of aerial images that see (e.g. depict the same portion of the geographic area) the source point in the 3D model.

As will be described in greater detail with respect to FIG. 5, in some implementations, a candidate source image can be selected as a source image based at least in part on an alignment between a direction of the camera ray associated with the pixel and the pose of the candidate image. In further implementations, a candidate source image can be selected as the source image based at least in part on a source image selected for one or more other pixels that neighbor the pixel.

At (212), method (200) can include generating a "mosaic" image based at least in part on the determined source images. In some implementations, the mosaic can be generated by mapping the source images to the corresponding pixels of the output image. In this manner, the output image can be textured using one or more source images that view the corresponding surface from a viewing direction that aligns (e.g. within a threshold) with the perspective of the output image. At (214), method (200) can include storing the generated mosaic image in a memory for future use. For instance, the mosaic may be provided to a user device for rendering by the user device in a user interface associated with a geographic information system in response to a user interaction with the user interface.

Figure 4:
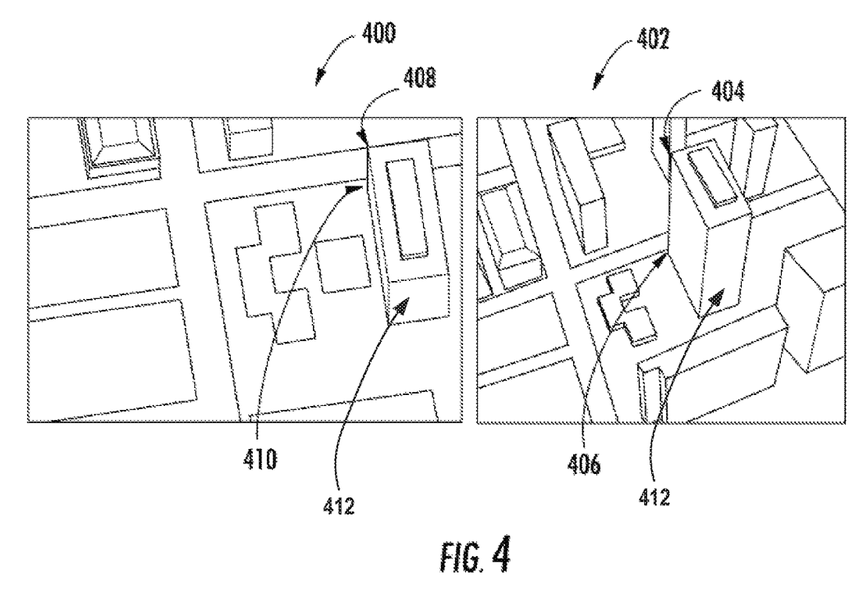
FIG. 4 depicts an example mosaic image according to example embodiments of the present disclosure.

For instance, FIG. 4 depicts an example image 400 according to example embodiments of the present disclosure. For instance, image 400 can be a mosaic image generated in accordance with example aspects of the present disclosure. In particular, image 400 can be generated using 3D model 402. As shown model 402 includes pixels 404 and 406. Image 400 includes corresponding pixels 408 and 410. As shown, pixels 404 and 408 depict a rooftop corner of building 412, and pixels 406 and 410 depict a portion of the street at the foot of building 412. As further shown, although they correspond to the same points, pixels 404 and 406 are separated by a greater distance than pixels 408 and 410. In this manner, it can be important to select the same source image for adjacent or neighboring pixels to preserve visual continuity.

Figure 5:
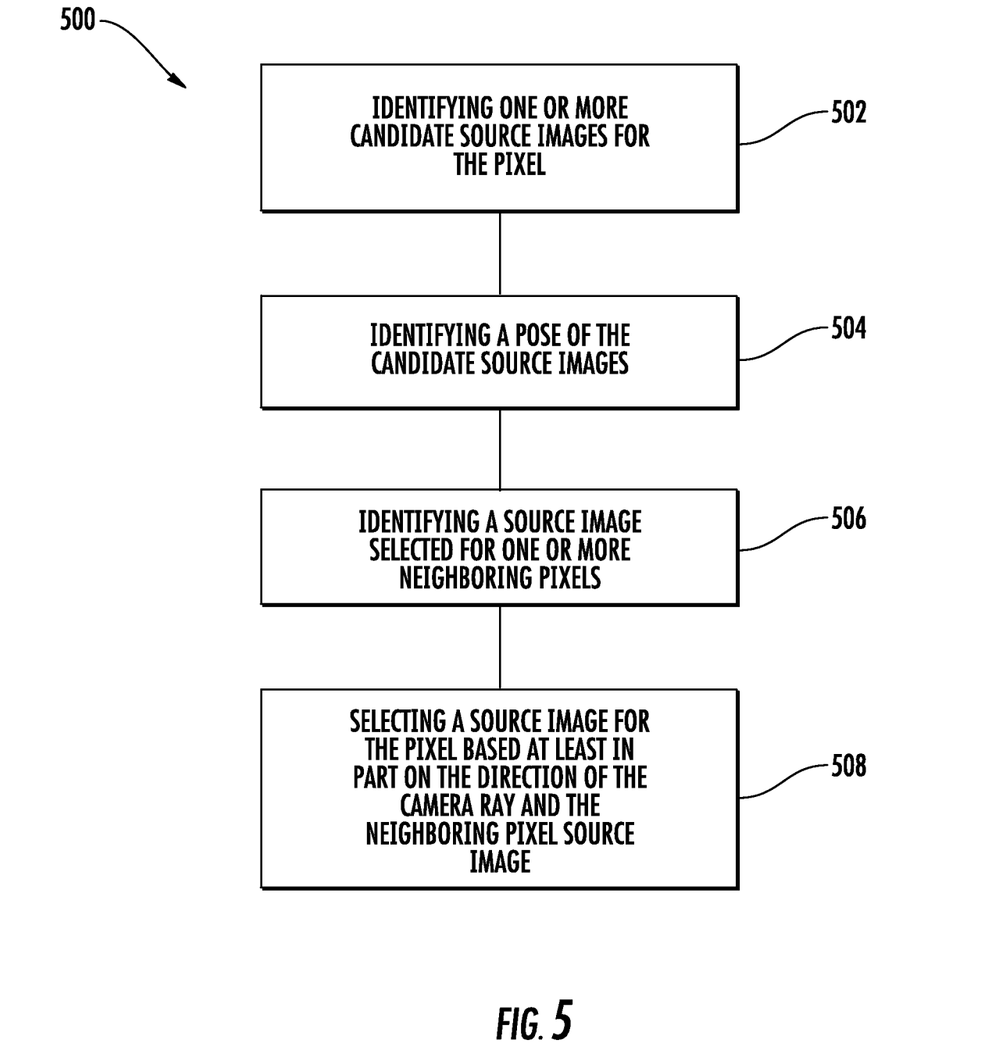
FIG. 5 depicts a flow diagram of an example method of determining a source image for a pixel of an output image according to example embodiments of the present disclosure.

FIG. 5 depicts a flow diagram of an example method (500) of determining one or more source images for a pixel to be implemented in a mosaic image. In particular, method (500) can correspond to example implementations of (210) of method (200) (e.g. for determining a source image for a single pixel). At (502), method (500) can include identifying one or more candidate source images for the pixel. As indicated above, the candidate source images can be one or more images from the plurality of aerial images that see (e.g. depict the same surface as) the source point on the 3D model. In this manner, each of the candidate source images can depict the surface or other point depicted by the pixel in the output image. For instance, the candidate source images can depict the surface depicted by the pixel in the output image from various perspectives.

At (504), method (500) can include identifying pose information associated with each of the candidate source images. For instance, the pose of each candidate source image can be accessed from a memory or determined using a suitable posing technique. The pose for each candidate source image can provide position and orientation information for the image capture device that captured the candidate source image. The pose of the images can provide data useful for selecting source images for generating a textured mosaic, such as the camera location and camera view direction of the candidate source image relative to various portions of the output image and/or polygon mesh. In particular, the pose for an image can be used to determine a camera ray associated with the pixel depicting the appropriate surface of the geographic area. In some implementations, the camera ray can be indicative of a viewing angle of the candidate image relative to the geographic area.

At (506), method (500) can include identifying one or more source images associated with one or more adjacent pixels. For instance, the one or more adjacent pixels can be pixels that neighbor the current pixel (e.g. the pixel for which a source image is currently being selected). In some implementations, identifying one or more source images associated with one or more adjacent pixels can include identifying source images that have been selected for one or more neighboring pixels. In some implementations, identifying one or more source images associated with one or more adjacent pixels can include identifying one or more source images to be selected for one or more adjacent pixels based at least in part on the pose of the images.

At (508), method (500) can include selecting a source image for the pixel. For instance, in some implementations the source image can be selected based at least in part on the direction of the camera ray. In particular, the source image can be the candidate source image having the camera ray that most closely aligns with the viewpoint associated with the output image. As another example, the source image can be a candidate source image that aligns with the viewpoint within a threshold. In further implementations, the source image can be selected based at least in part on the one or more source images associated with the adjacent pixel(s). For instance, the source image for the current pixel can be selected to be the same as a source image used for the adjacent pixel(s). In this manner, the source images for each pixel can be selected to reduce or minimize a number of source images used to texture the mosaic.

In some implementations, the source image can be selected based at least in part on the camera rays of the candidate source images and the neighboring source images. For instance, the source image can be selected based on an optimization having simultaneous objectives of increasing an alignment between the source image viewing angle (e.g. as evidenced by the camera ray associated with the source image) and the viewpoint of the output image, and decreasing a total number of source images used to texture or populate the mosaic. In particular, the optimization can simultaneously take into account the alignment between the source image and the output image, and one or more source images selected (or to be selected) for one or more adjacent pixels in the output image. In this manner, solving the optimization can include determining a trade-off between selecting the source image that most closely aligns with the viewpoint of the output image, and selecting the same source image for adjacent pixels.

In some implementations, method (500) can be repeated for each pixel of the output image to determine a source image for each pixel in the output image. For instance, in some implementations, the source images can be determined on a pixel-by-pixel basis. For instance, the source images may be selected in a serial manner, in which source images re determined for one pixel at a time. In other implementations, at least a portion of the source images may be determined in a parallel manner. For instance, source images may be determined simultaneously for two or more pixels.

Figure 6:
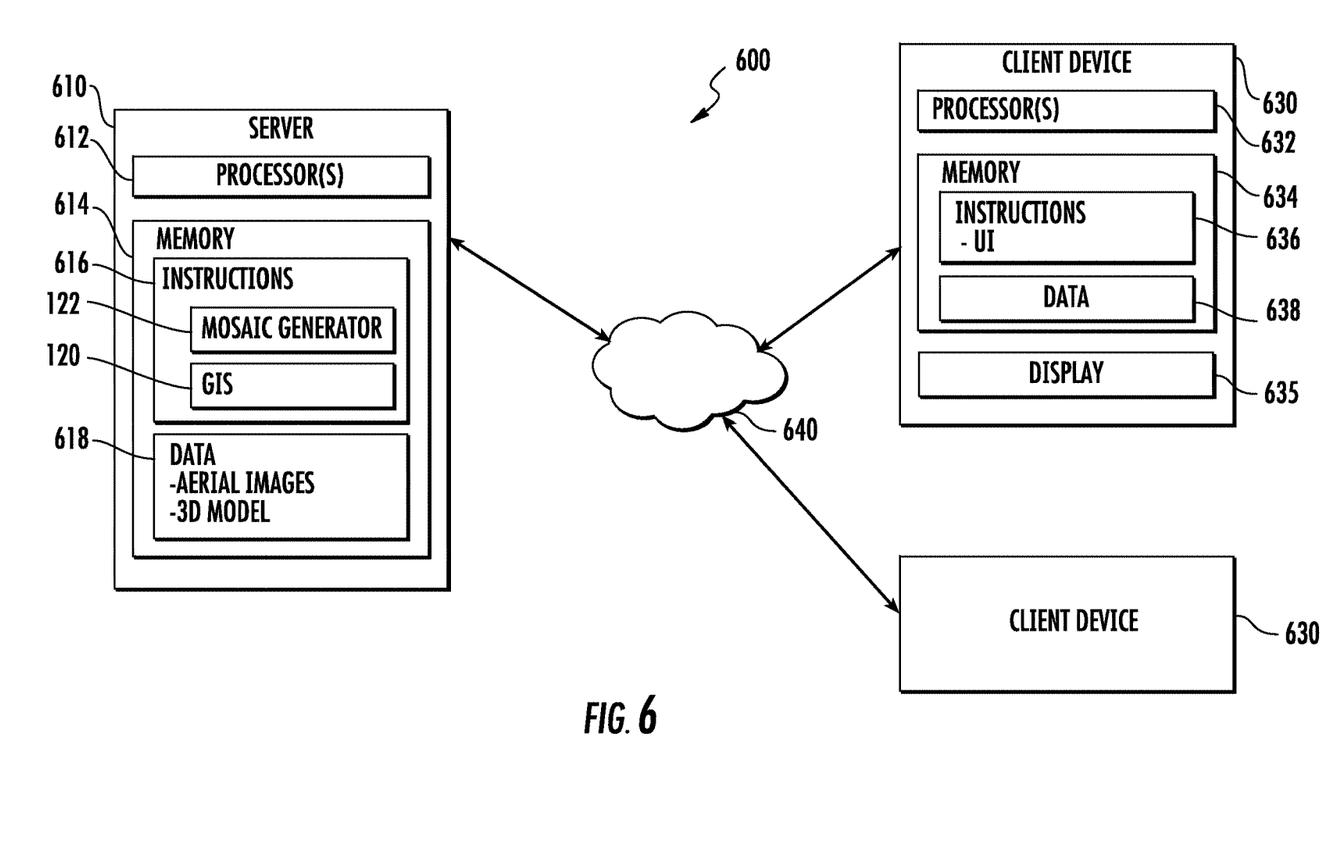
FIG. 6 depicts an example system according to example embodiments of the present disclosure.

FIG. 6 depicts an example computing system 600 that can be used to implement the methods and systems according to example aspects of the present disclosure. The system 600 can be implemented using a client-server architecture that includes a server 610 that communicates with one or more client devices 630 over a network 640. The system 600 can be implemented using other suitable architectures, such as a single computing device.

The system 600 includes a server 610, such as a web server. The server 610 can host a geographic information system, such as a geographic information system associated with a mapping service. The server 610 can be implemented using any suitable computing device(s). The server 610 can have one or more processors 612 and one or more memory devices 614. The server 610 can also include a network interface used to communicate with one or more client devices 630 over the network 640. The network interface can include any suitable components for interfacing with one more networks, including for example, transmitters, receivers, ports, controllers, antennas, or other suitable components.

The one or more processors 612 can include any suitable processing device, such as a microprocessor, microcontroller, integrated circuit, logic device, or other suitable processing device. The one or more memory devices 614 can include one or more computer-readable media, including, but not limited to, non-transitory computer-readable media, RAM, ROM, hard drives, flash drives, or other memory devices. The one or more memory devices 614 can store information accessible by the one or more processors 612, including computer-readable instructions 616 that can be executed by the one or more processors 612. The instructions 616 can be any set of instructions that when executed by the one or more processors 612, cause the one or more processors 612 to perform operations. For instance, the instructions 616 can be executed by the one or more processors 612 to implement the geographic information system 120 and mosaic generator 122 of FIG. 1.

As shown in FIG. 6, the one or more memory devices 614 can also store data 618 that can be retrieved, manipulated, created, or stored by the one or more processors 612. The data 618 can include, for instance, aerial images, 3D model, and other data. The data 618 can be stored in one or more databases. The one or more databases can be connected to the server 610 by a high bandwidth LAN or WAN, or can also be connected to server 610 through network 640. The one or more databases can be split up so that they are located in multiple locales.

The server 610 can exchange data with one or more client devices 630 over the network 640. Although two client devices 630 are illustrated in FIG. 6, any number of client devices 630 can be connected to the server 610 over the network 640. Each of the client devices 630 can be any suitable type of computing device, such as a general purpose computer, special purpose computer, laptop, desktop, mobile device, navigation system, smartphone, tablet, wearable computing device, a display with one or more processors, or other suitable computing device.

Similar to the server 610, a client device 630 can include one or more processor(s) 632 and a memory 634. The one or more processor(s) 632 can include one or more central processing units (CPUs), graphics processing units (GPUs) dedicated to efficiently rendering images or performing other specialized calculations, and/or other processing devices. The memory 634 can include one or more computer-readable media and can store information accessible by the one or more processors 632, including instructions 636 that can be executed by the one or more processors 632 and data 638. For instance, the memory 634 can store instructions 636 for implementing a user interface module for textured mosaic images determined according to example aspects of the present disclosure.

The client device 630 of FIG. 6 can include various input/output devices for providing and receiving information from a user, such as a touch screen, touch pad, data entry keys, speakers, and/or a microphone suitable for voice recognition. For instance, the client device 630 can have a display device 635 for presenting a user interface displaying mosaic images according to example aspects of the present disclosure.

The client device 630 can also include a network interface used to communicate with one or more remote computing devices (e.g. server 610) over the network 640. The network interface can include any suitable components for interfacing with one more networks, including for example, transmitters, receivers, ports, controllers, antennas, or other suitable components.

The network 640 can be any type of communications network, such as a local area network (e.g. intranet), wide area network (e.g. Internet), cellular network, or some combination thereof. The network 640 can also include a direct connection between a client device 630 and the server 610. In general, communication between the server 610 and a client device 630 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of determining an image, the method comprising:

receiving, by one or more computing devices, a request from a user device for a two-dimensional image of a geographic area from a first perspective;

obtaining, by one or more computing devices, data indicative of a three-dimensional model of the geographic area;

generating, by the one or more computing devices, a two-dimensional output image depicting at least a portion of the geographic area by capturing one or more snapshots of the three-dimensional model of the geographic area from the first perspective using a virtual camera;

reprojecting, by the one or more computing devices, each pixel in the output image to a corresponding source point of the three-dimensional model;

obtaining, by the one or more computing devices, a plurality of aerial images depicting the geographic area;

determining, by the one or more computing devices, for each pixel in the output image, a source image from the plurality of aerial images based at least in part on the reprojection of the pixel in the output image to the three-dimensional model; and providing, by the one or more computing devices, data indicative of the two-dimensional image to the user device based at least in part on the determined source images for each pixel in the output image, wherein the data indicative of the two-dimensional image is generated at least in part by mapping the source images for each pixel to the corresponding pixels of the output image.

2. The computer-implemented method of claim 1, wherein at least a portion of each aerial image in the plurality of aerial images overlaps at least a portion of at least one other aerial image in the plurality of aerial images.

3. The computer-implemented method of claim 1, wherein the virtual camera is an orthographic virtual camera.

4. The computer-implemented method of claim 1, wherein the one or more snap shots are captured from a nadir perspective.

5. The computer-implemented method of claim 1, wherein the one or more snapshots are captured from an oblique perspective.

6. The computer-implemented method of claim 1, wherein the data indicative of the three-dimensional model comprises a polygon mesh of the geographic area.

7. The computer-implemented method of claim 1, wherein reprojecting, by the one or more computing devices, each pixel in the output image to the three-dimensional model comprises tracing a camera ray associated with each pixel to a corresponding source point of the three-dimensional model.

8. The computer-implemented method of claim 1, wherein determining, by the one or more computing devices, for each pixel in the output image, a source image from the plurality of aerial images comprises:

determining, by the one or more computing devices, an orientation associated with each aerial image of the plurality of aerial images; and selecting, by the one or more computing devices, a source image from the plurality of aerial images based at least in part on the orientation of the source image.

9. The computer-implemented method of claim 8, wherein determining, by the one or more computing devices, for each pixel in the output image, a source image from the plurality of aerial images comprises:

identifying, by the one or more computing devices, one or more source images associated with one or more neighboring pixels; and selecting, by the one or more computing devices, a source image from the plurality of aerial images based at least in part on the one or more source image associated with the one or more neighboring pixels.

10. The computer-implemented method of claim 9, wherein determining, by the one or more computing devices, for each pixel in the output image, a source image from the plurality of aerial images comprises solving an optimization based at least in part on the orientation of each aerial image and the one or more source images associated with the one or more neighboring pixels.

11. The computer-implemented method of claim 1, further comprising generating, by the one or more computing devices, a two-dimensional image based at least in part on the determined source images for each pixel in the output image, and wherein providing, by the one or more computing devices, data indicative of the two-dimensional image to the user device comprises providing, by the one or more computing devices, data associated with the generated two-dimensional image to the user device.

12. The computer-implemented method of claim 1, wherein the request for the two-dimensional image by the user device is for display by a remote computing device in a user interface associated with a geographic information system.

13. A computing system, comprising:

one or more processors; and one or more memory devices, the one or more memory devices storing computer-readable instructions that when executed by the one or more processors cause the one or more processors to perform operations, the operations comprising:

receiving a request from a user device for a two-dimensional image of a geographic area from a first perspective;

obtaining data indicative of a three-dimensional model of the geographic area;

generating a two-dimensional output image depicting at least a portion of the geographic by capturing one or more snapshots of the three-dimensional model of the geographic area from the first perspective using a virtual camera;

reprojecting each pixel in the output image to a corresponding source point of the three-dimensional model;

obtaining a plurality of aerial images depicting the geographic area;

determining, for each pixel in the output image, a source image from the plurality of aerial images based at least in part on the reprojection of the pixel in the output image to the three-dimensional model.

14. The computing system of claim 13, wherein determining, for each pixel in the output image, a source image from the plurality of aerial images comprises:

determining an orientation associated with each aerial image of the plurality of aerial images; and selecting a source image from the plurality of aerial images based at least in part on the orientation of the source image.

15. The computing system of claim 14, wherein determining, for each pixel in the output image, a source image from the plurality of aerial images comprises:

identifying one or more source images associated with one or more neighboring pixels; and selecting a source image from the plurality of aerial images based at least in part on the one or more source image associated with the one or more neighboring pixels.

16. One or more tangible, non-transitory computer-readable media storing computer-readable instructions that when executed by one or more processors cause the one or more processors to perform operations, the operations comprising:

receiving a request from a user device for a two-dimensional image of a geographic area from a first perspective;

obtaining data indicative of a three-dimensional model of the geographic area;

generating a two-dimensional output image depicting at least a portion of the geographic area by capturing one or more snapshots of the three-dimensional model of the geographic area from the first perspective using a virtual camera;

reprojecting each pixel in the output image to a corresponding source point of the three-dimensional model;

obtaining a plurality of aerial images depicting the geographic area;

determining, for each pixel in the output image, a source image from the plurality of aerial images based at least in part on the reprojection of the pixel in the output image to the three-dimensional model.

17. The one or more tangible, non-transitory computer-readable media of claim 16, wherein determining, for each pixel in the output image, a source image from the plurality of aerial images comprises solving an optimization based at least in part on an orientation of each aerial image and one or more source images associated with one or more neighboring pixels.

18. The one or more tangible, non-transitory computer-readable media of claim 16, the operations further comprising generating a two-dimensional image based at least in part on the determined source images for each pixel in the output image.

* * * * *